(12) United States Patent
Baumgart et al.

(10) Patent No.: US 8,120,613 B2
(45) Date of Patent: Feb. 21, 2012

(54) METHOD AND APPARATUS FOR REAL-TIME DIGITAL IMAGE ACQUISITION, STORAGE, AND RETRIEVAL

(75) Inventors: John Baumgart, Hoffman Estates, IL (US); Christopher Drexler, Lake in the Hills, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1022 days.

(21) Appl. No.: 11/675,212

(22) Filed: Feb. 15, 2007

(65) Prior Publication Data

US 2008/0123896 A1 May 29, 2008

Related U.S. Application Data

(60) Provisional application No. 60/867,616, filed on Nov. 29, 2006.

(51) Int. Cl.
*G09G 5/39* (2006.01)
*G09G 5/36* (2006.01)
*G06F 13/00* (2006.01)
*G06F 12/02* (2006.01)

(52) U.S. Cl. ......... 345/536; 345/531; 345/544; 345/545

(58) Field of Classification Search .................. 382/100; 711/172, 173; 345/531, 536, 544, 543
See application file for complete search history.

(56) References Cited

U.S. PATENT DOCUMENTS

| | | | | | |
|---|---|---|---|---|---|
| 5,339,413 A | * | 8/1994 | Koval et al. | .................... | 719/314 |
| 5,487,167 A | * | 1/1996 | Dinallo et al. | ................. | 715/203 |
| 5,619,733 A | * | 4/1997 | Noe et al. | .......................... | 710/61 |
| 5,652,912 A | * | 7/1997 | Lofgren et al. | ................. | 710/21 |
| 5,687,132 A | * | 11/1997 | Rao | ........................... | 365/230.03 |
| 5,832,309 A | * | 11/1998 | Noe et al. | ......................... | 710/61 |
| 5,915,265 A | * | 6/1999 | Crocker et al. | ............... | 711/170 |
| 5,924,991 A | * | 7/1999 | Hossack et al. | ............... | 600/443 |
| 5,953,746 A | * | 9/1999 | Crocker et al. | ............... | 711/173 |
| 6,101,546 A | * | 8/2000 | Hunt | ............................ | 709/231 |
| 6,104,417 A | * | 8/2000 | Nielsen et al. | ................ | 345/542 |
| 6,615,312 B1 | * | 9/2003 | Hamlin et al. | ................ | 711/112 |
| 6,665,772 B1 | * | 12/2003 | Hamlin | ......................... | 711/112 |
| 6,704,813 B2 | * | 3/2004 | Smirnov et al. | .................. | 710/52 |
| 6,733,449 B1 | * | 5/2004 | Krishnamurthy et al. | .... | 600/437 |
| 6,757,019 B1 | * | 6/2004 | Hsieh et al. | .................... | 348/302 |
| 6,961,083 B2 | * | 11/2005 | Obrador et al. | ............. | 348/220.1 |
| 2002/0042834 A1 | * | 4/2002 | Kremens et al. | .............. | 709/231 |
| 2004/0057697 A1 | * | 3/2004 | Renzi et al. | ..................... | 386/83 |
| 2005/0028213 A1 | * | 2/2005 | Adler et al. | ..................... | 725/89 |

* cited by examiner

*Primary Examiner* — Aaron M Richer
*Assistant Examiner* — Robert Craddock
(74) *Attorney, Agent, or Firm* — Alexander J Burke

(57) ABSTRACT

The invention described in this application is an image file system for the acquisition and storage of streaming digital image data onto persistent storage media in real time and for full-rate playback of streaming digital image data stored on persistent storage media. Input/output of non-streaming digital image data is processed in system memory with write/read operations buffered by native operating system input/output support. Input/output of streaming digital data is processed in high-speed streaming digital image data I/O memory with write/read operations buffered by a high-performance image buffer thread.

18 Claims, 8 Drawing Sheets

METHOD AND APPARATUS FOR REAL-TIME DIGITAL IMAGE ACQUISITION, STORAGE, AND RETRIEVAL

This application claims the benefit of U.S. Provisional Application No. 60/867,616 filed Nov. 29, 2006, which is incorporated herein by reference.

BACKGROUND OF THE INVENTION

The present invention relates generally to medical informatics, and more particularly to real-time acquisition, storage, and retrieval of digital images.

Development of real-time image analysis techniques has led to major advances in medical diagnostics. For some applications, static images are adequate; for example, an X-ray of a bone fracture. For other applications, however, streaming images provide more comprehensive information. Consider heart disorders, for example. For functional analysis, real-time dynamic X-ray angiography provides streaming images of the blood vessels while blood is flowing through them, as the heart is beating.

The output of many medical instruments, such as X-ray and Magnetic Resonance Imaging (MRI) diagnostic units, is a stream of digital image data from which dynamic images are created. Requirements for high spatial and temporal resolution produce large files which need to be processed in real time. Spatial resolution is a function of pixel density. Temporal resolution is a function of frames per second. As an example, a frame comprising 1024×1024 pixels with a pixel depth of 2 bytes requires approximately 2 Mbytes. At a frame rate of 30 frames/second, the data rate is approximately 63 Mbyte/second. A video record requires approximately 3.8 Gbyte for a 1-minute record. Herein, the term "frame" refers to a set of pixels of a defined matrix size.

Many equipment providers have proprietary systems for processing streaming digital image data into streaming images. To provide compatibility among different equipment providers, however, the Digital Imaging and Communications in Medicine (DICOM) standards have evolved. A DICOM standard specifies the format for encoding pixel data. Conformance to DICOM standards is a major goal of manufacturers of medical digital imaging equipment. Another goal of equipment manufacturers is to reduce costs by using common platforms, such as workstations running on a Windows operating system (OS), instead of custom hardware and software.

As discussed above, acquisition and storage of streaming digital image data entails large amounts of data being stored to persistent storage media, such as a hard drive, in real time. Full-rate playback of streaming images from digital image data stored on persistent media also requires high data transfer rates. Standard processing of input/output (I/O) by a native OS is too slow and may result in data being lost during acquisition and storage. One option is to bypass an OS altogether and map the digital image data directly onto hard disks using a proprietary file system that increases the transfer rate of the disk drive. The format of these files, however, do not conform to DICOM standards. What is needed is an image file system for acquisition and storage of real-time streaming digital image data on persistent storage media, and for full-rate playback of images stored on persistent storage media. An image file system which saves files in a format conforming to DICOM standards is desirable.

SUMMARY

The invention provides an image file system for the acquisition and storage of streaming digital image data onto persistent storage media in real time, and for full-rate playback of streaming digital image data stored on persistent storage media. In an embodiment of the invention, read/write operations for streaming digital image data are processed in high-speed memory managed by an image buffering thread bypassing read/write operations buffered by input/output support of a native operating system.

In accordance with an embodiment of the invention, an image file system client requests an image file system to write digital image data to persistent storage media. In the request, the image file system client indicates to the image file system whether the digital image data is streaming or non-streaming. If the digital image data is non-streaming, the image file system processes the request with a write operation buffered by a native operating system. If the digital image data is streaming, the image file system processes the request by passing control to a high-speed image buffering thread. The image buffering thread buffers the streaming digital image data in high-speed streaming digital image I/O memory and processes the request with a write operation not buffered by the native operating system.

In accordance with an embodiment of the invention, an image file system client requests an image file system to read digital image data from persistent storage media. In the request, the image file system client indicates to the image file system whether the digital image data is streaming or non-streaming. If the digital image data is non-streaming, the image file system processes the request with a read operation buffered by a native operating system. If the digital image data is streaming, the image file system processes the request by passing control to a high-speed image buffering thread. The image buffering thread buffers the streaming digital image data in high-speed streaming digital image I/O memory and processes the request with a read operation not buffered by the native operating system.

These and other advantages of the invention will be apparent to those of ordinary skill in the art by reference to the following detailed description and the accompanying drawings.

DETAILED DESCRIPTION OF EXEMPLARY EMBODIMENTS

Figure 1:
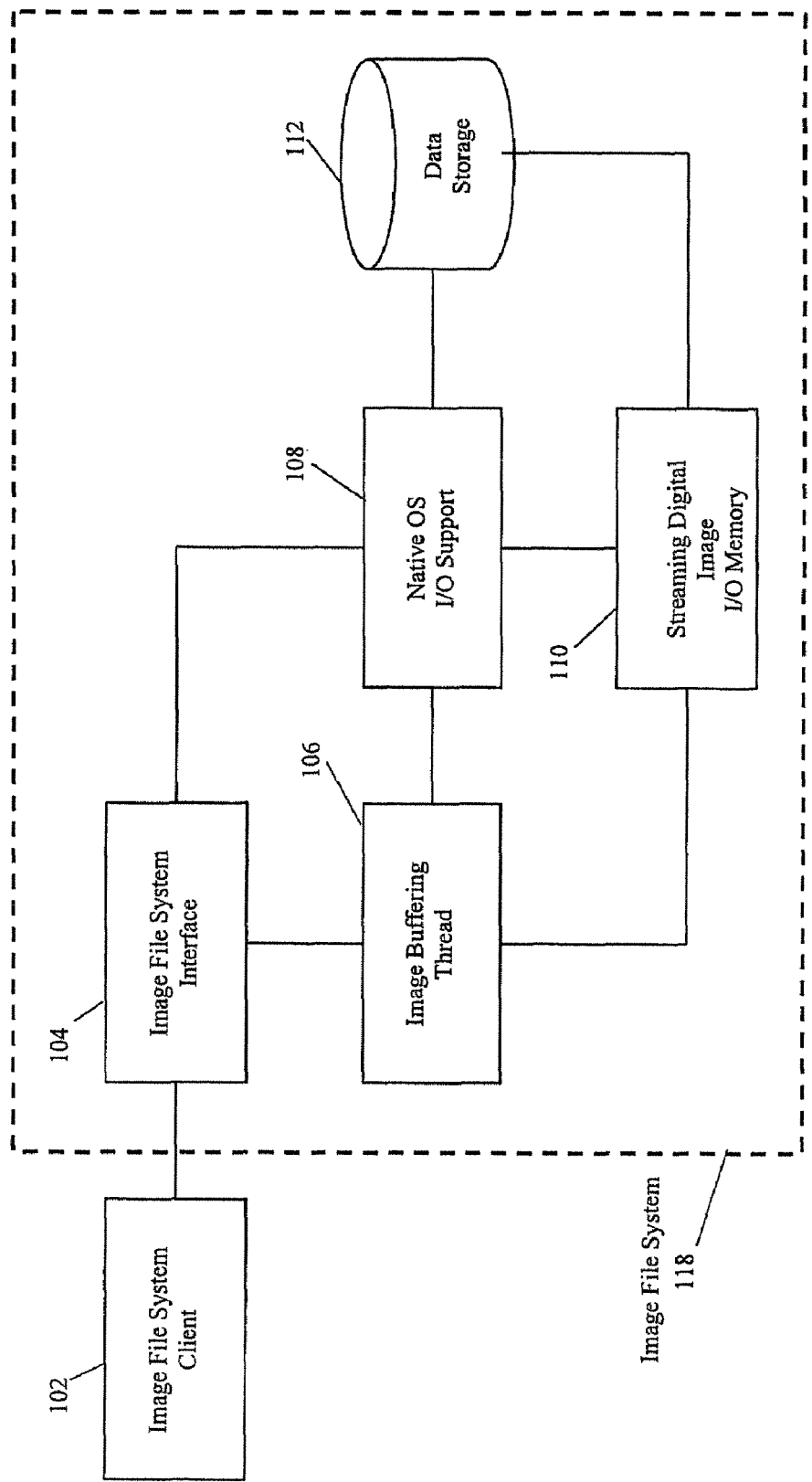
FIG. 1 shows a high-level block diagram of an image file system.

FIG. 1 shows a high-level block diagram of one embodiment of a real-time system for the acquisition, storage, and retrieval of digital image data. Herein, this system is referred to as an image file system (IFS), as denoted by 118 in FIG. 1. Image file system client 102 refers to an application which requires real-time acquisition, storage, and retrieval of digital image data. Examples of IFS client 102 are an X-ray diagnostic system which needs to capture and store images, and a video system which needs to playback images.

Image file system 118 comprises IFS interface 104, image buffering thread (IBT) 106, native operating system input/output (OS I/O) support 108, streaming digital image input/output (I/O) memory 110, and data storage 112. Data storage 112 is typically a hard drive or a redundant array of independent disks (RAID), but may comprise other persistent storage media such as compact disc (CD) or digital versatile disc (DVD). Note that IFS client 102 does not interface directly with native OS I/O support 108, and does not interface directly with data storage 112. All data transfers between IFS client 102 and IFS 118 are directed through IFS interface 104. The functions of these subsystems are discussed in further detail below. Herein, "native operating system" refers to an operating system which manages the overall hardware and software resources of an image file system. Examples of native operating systems include Windows, UNIX, and Linux. Native operating systems may also comprise proprietary operating systems.

The blocks shown in FIG. 1 may represent both functional entities and hardware components. As discussed above, data storage 112 may be a hard drive. Streaming digital image I/O memory 110 may be high-speed semiconductor video random access memory. Image file system interface 104 may be an Ethernet network interface card.

Figure 2:
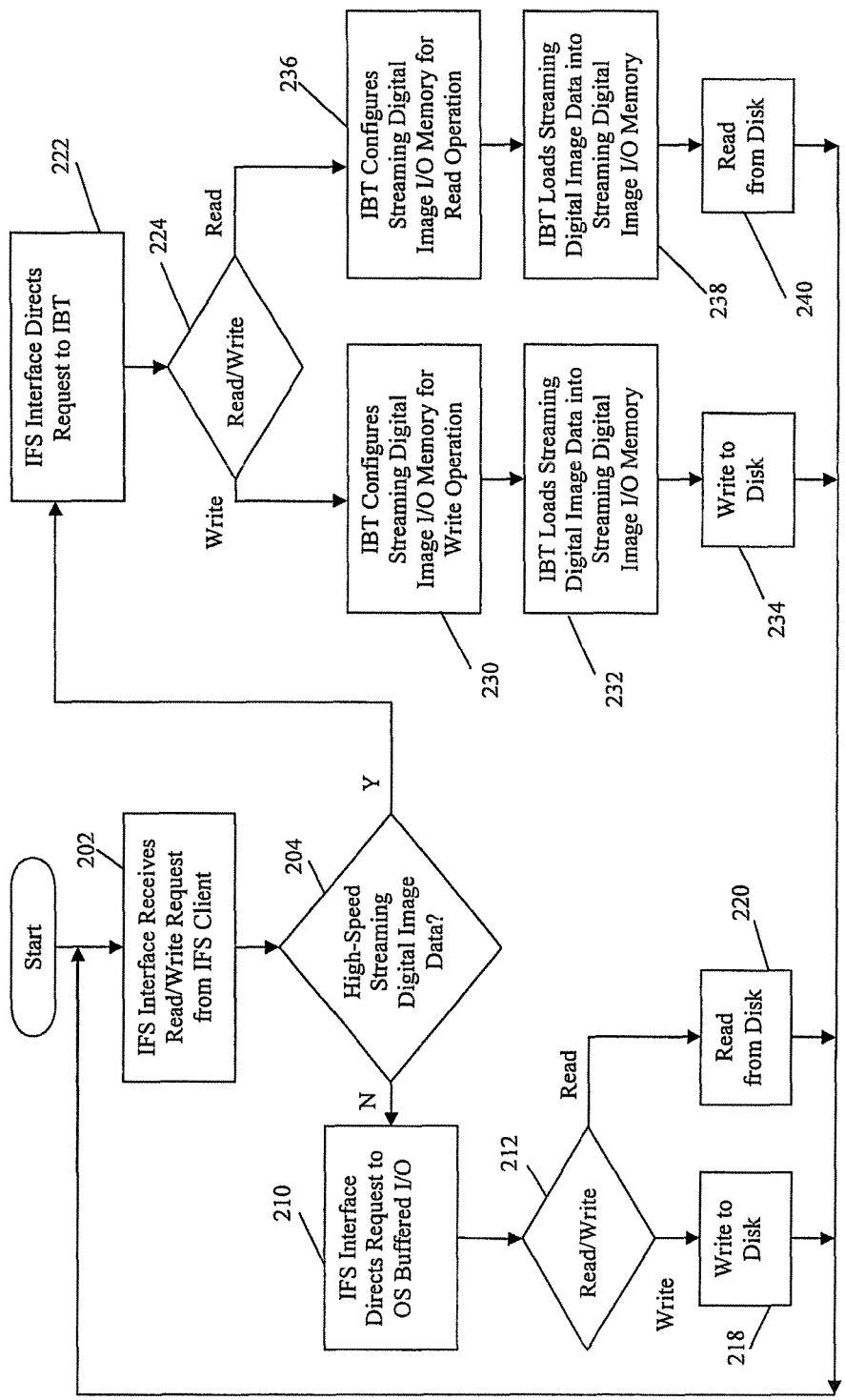
FIG. 2 is a flowchart showing the sequence for processing read/write requests.

The flowchart in FIG. 2, in conjunction with the high-level block diagram in FIG. 1, illustrates basic operating procedures for processing digital image data by an IFS. More details are provided in specific examples below. In step 202, IFS interface 104 receives a read/write request from IFS client 102. In step 204, IFS interface 104 analyzes the request to determine whether the request is for transfer of streaming digital image data. IFS client 102 designates whether the data is streaming digital image data, and this designation is included in the request. If the request is not for the transfer of streaming digital image data, then control passes to step 210, where IFS interface 104 directs native OS I/O support 108 to process a buffered mode read/write.

Herein, "buffered mode read/write" refers to processing of I/O data wherein the data is buffered by the native OS. Herein, "unbuffered mode read/write" refers to processing of I/O data wherein the data is buffered by an application or process running on the native OS, as described in further detail below. In an embodiment of an IFS, an "unbuffered mode read/write" may be faster than a "buffered mode read/write."

In step 212, native OS I/O support 108 determines whether the request is for a read or a write operation. If it is for a write operation, then control passes to step 218, where IFS client 102 writes data to data storage 112 using buffered mode write by native OS I/O support 108. In step 212, if the request is for a read operation, then control passes to step 220, where IFS client 102 reads data from data storage 112 using buffered mode read by native OS I/O support 108.

If, in step 204, IFS interface 104 determines that the request is for streaming digital image data, then control passes to step 222, where IFS interface 104 directs the request to IBT 106. IBT 106 is a separate thread which manages data buffers in streaming digital image I/O memory 110 for higher performance. Herein, "streaming digital image I/O memory" refers to memory with sufficient speed to process streaming digital image data in real time. In some instances, streaming digital image I/O memory may need to be higher speed than system memory used by the native OS. Transfer of data between streaming digital image I/O memory 110 and data storage 112 is processed as an unbuffered mode read/write by native I/O support 108 at the request of IBT 106.

In step 224, IBT 106 determines whether the request is for write or read operation. If the request is for a write operation, then control passes to step 230, where IBT 106 configures streaming digital image I/O memory 110 for write operation. In step 232, IBT 106 loads streaming digital image data into streaming digital image I/O memory 110. In step 234, IBT 106 requests native OS I/O support 108 to perform an unbuffered mode write to write data from streaming digital image I/O memory 110 to data storage 112. More details are provided below for a specific example.

If, in step 224, the request is for a read operation, then control passes to step 236, where IBT 106 configures streaming digital image I/O memory 110 for read operation. In step 238, IBT 106 requests native OS I/O support 108 to perform an unbuffered mode read to read data from data storage 112 into streaming image I/O memory 110. In step 240, IFS client 102 reads data from streaming digital image I/O memory 110. More details are provided below for a specific example.

In an embodiment of the invention, there may be four primary operations for transferring digital image data between IFS client 102 and data storage 112: single-frame write, single-frame read, streaming write, and streaming read. In a single-frame write, IFS client 102 requests IFS interface 104 to write a single frame of digital image data to a file in data storage 112; a single-frame write is a random-access operation. Similarly, in a single-frame read, IFS client 102 requests IFS interface 104 to read a single frame of digital image data from data storage 112; a single-frame read is a random access operation. For a single-frame write and a single-frame read, IFS interface 104 does not need to incur the additional overhead of configuring IBT 106 and streaming digital image I/O memory 110. As shown in FIG. 2, steps 208-220, single-frame writes and single-frame reads use standard buffered mode read/write by native OS I/O support 108. These I/O processes are well-known in the art and will not be discussed further herein.

Figure 3:
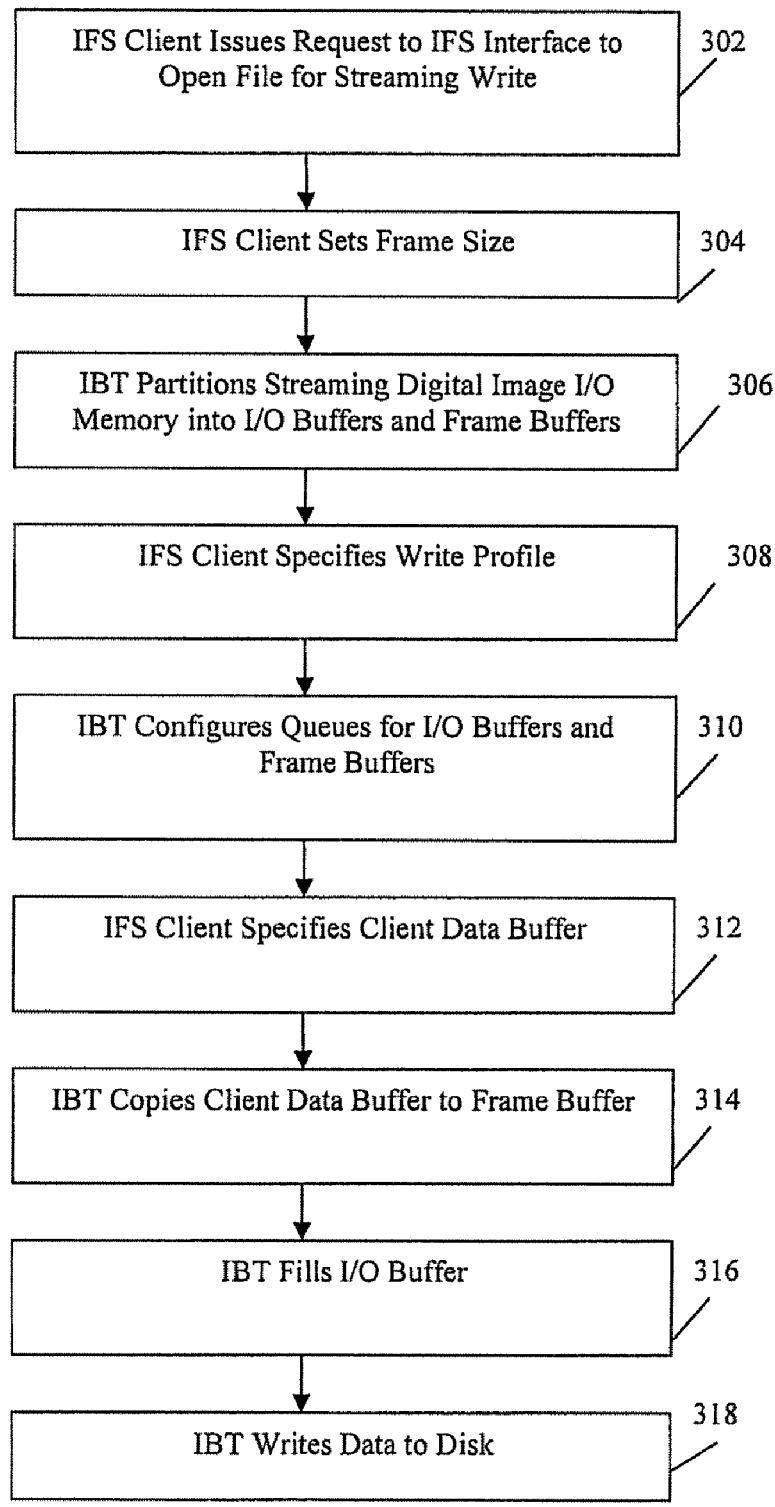
FIG. 3 is a flowchart of a streaming write process.
Figure 4:
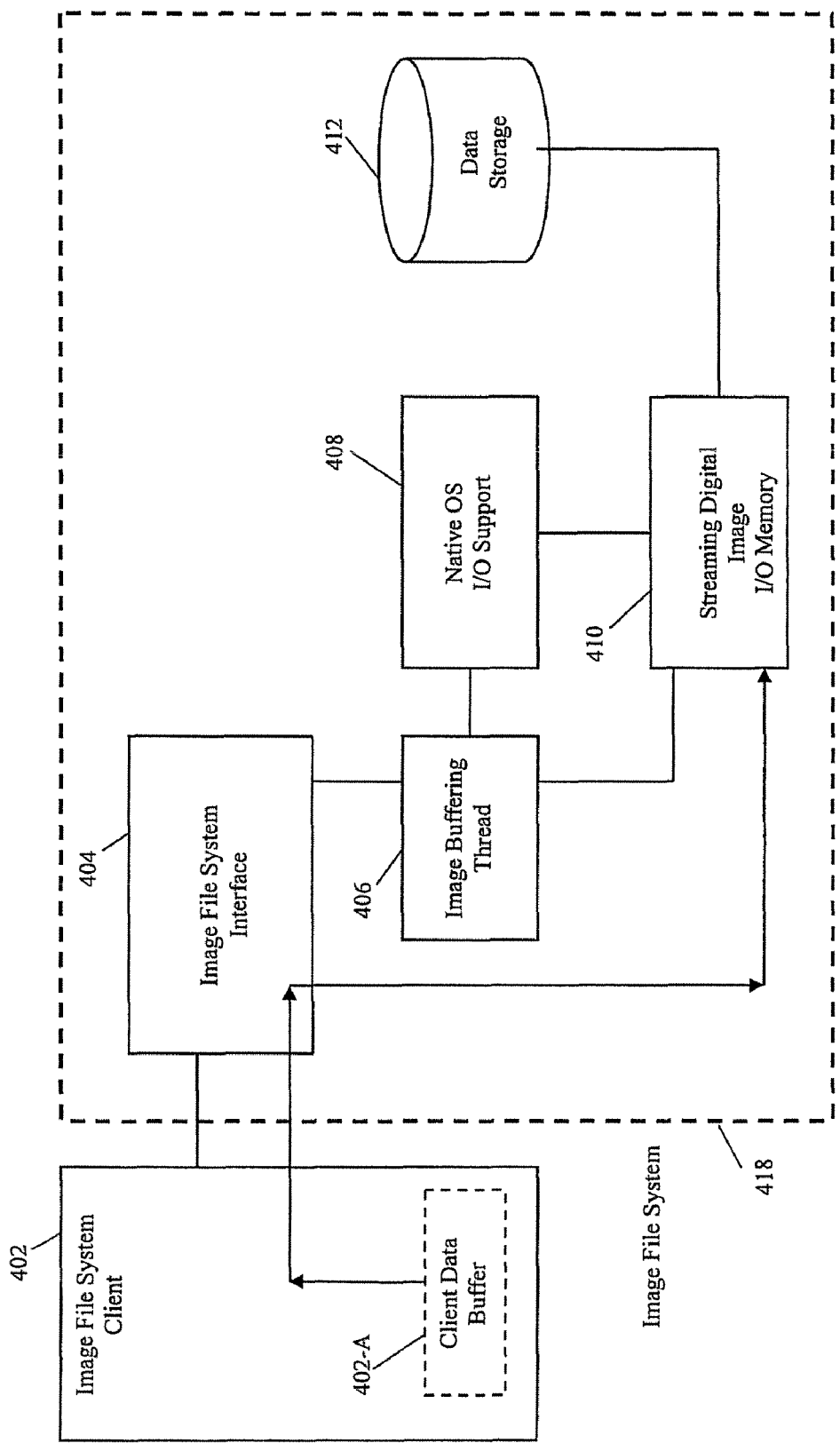
FIG. 4 shows a high-level block diagram of an embodiment of an image file system.

The flowchart in FIG. 3, in conjunction with the high-level architecture diagram in FIG. 4, illustrates a process for a streaming write. In a streaming write, an IFS client specifies a sequence in which a series of frames will be written. The rate at which frames are written is sufficient to record streaming digital image data in real time. In step 302, IFS client 402 issues a request to IFS 418 via IFS interface 404 to open a file in which to write streaming image data. In step 304, IFS client 402 transmits to IFS interface 404 the pixel dimensions of a single frame that will be written to the file. IFS interface 404 then transmits the pixel dimensions to IBT 406. In step 306, IBT 406 partitions streaming digital image I/O memory 410 into multiple I/O buffers. Each I/O buffer is then further partitioned into frame buffers. The partitions and buffers are configured for efficient transfer of data to data storage 412, as further discussed below.

In step 308, IFS client 402 transmits to IFS interface 404 a write profile. The write profile defines a sequence in which IFS client 402 will write images to IFS interface 404. IFS interface 404 then transmits this write profile to IBT 406. In step 310, IBT 406 configures queues for I/O buffers and frame buffers in streaming digital image I/O memory 410. In step 312, IFS client 402 specifies client data buffer 402-A that contains the client data to be written. In step 314, client data in client data buffer 402-A is copied into frame buffers in streaming digital image I/O memory 410. In step 316, IBT 406 calculates the condition under which an I/O buffer is to be written to data storage 412. An I/O buffer is to be written to data storage 412 when every frame buffer in the I/O buffer has either been filled with client data, been filled with data cached from data storage 412, or been considered an unused frame buffer.

Figure 5:
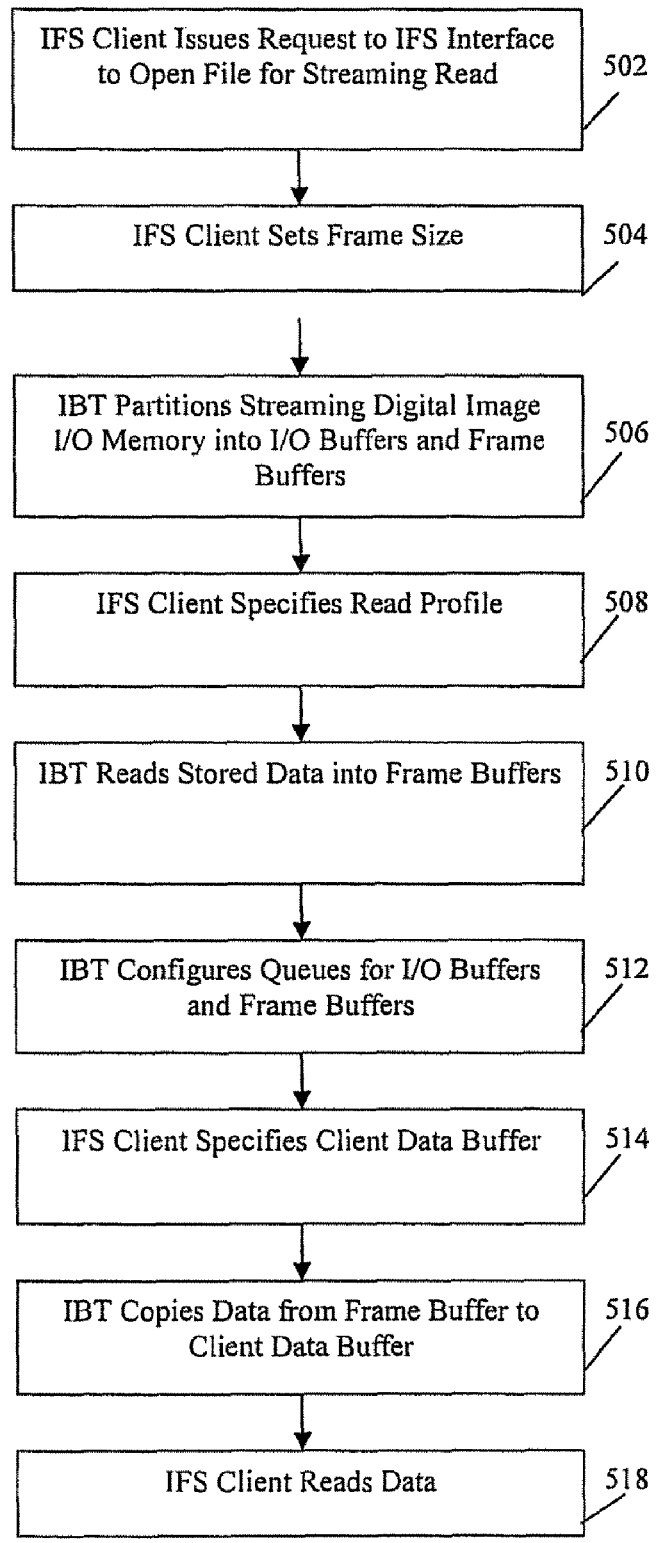
FIG. 5 is a flowchart of a streaming read process.
Figure 6:
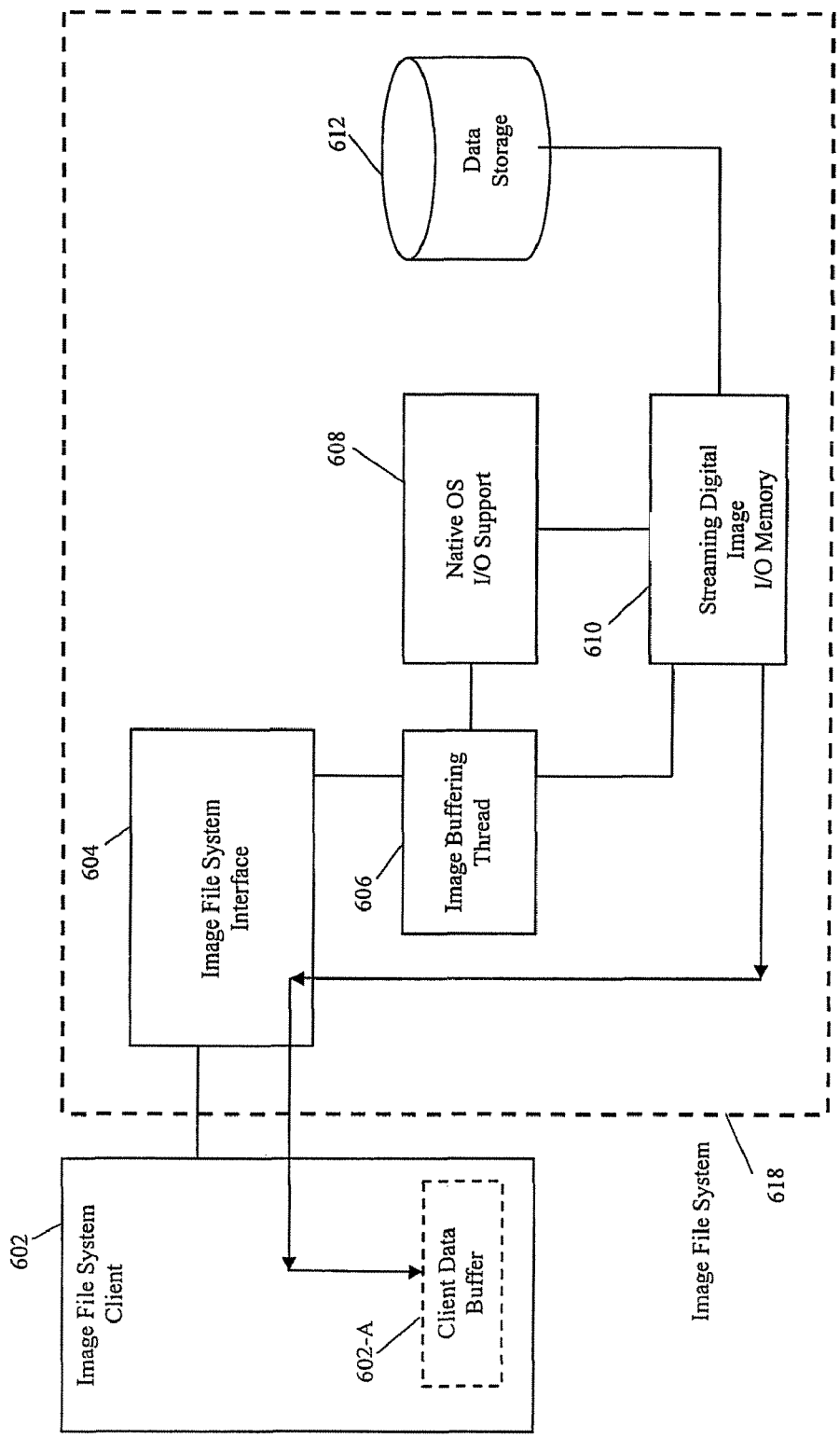
FIG. 6 shows a high-level block diagram of an embodiment of an image file system.

The flowchart in FIG. 5, in conjunction with the high-level architecture diagram in FIG. 6, illustrates a process for streaming read. In a streaming read, an IFS client specifies a sequence in which frames are to be read. The rate at which frames are read is sufficient to support full-rate playback of frames wherein the frames were written in a streaming write mode at a rate sufficient to record digital image data in real time. In step 502, IFS client 602 issues a request to IFS interface 604 to open a file from which streaming digital image data is to be read. In step 504, IFS client 602 transmits to IFS interface 604 the pixel dimensions of a single frame that is contained within the file that has been opened. IFS interface 604 then transmits the pixel dimensions to IBT 606. In step 506, IBT 606 partitions streaming digital image I/O memory 610 into I/O buffers and frame buffers.

In step 508, IFS client 602 then transmits a read profile to IFS interface 604. The read profile specifies the sequence in which images will be read. IFS interface 504 then transmits the read profile to IBT 606. In step 510, IBT 606 requests native OS I/O support 608 to run an unbuffered read to read, in the specified order, data from data storage 612 to frame buffers in streaming digital image I/O memory 610. In step 512, IBT 606 then configures queues for frame buffers which have been filled. In step 514, IFS client 602 specifies client data buffer 602-A into which data will be read. In step 516, the frame buffer at the head of the queue is copied into client data buffer 602-A. In step 518, IFS client 602 reads data in client data buffer 602-A. Since the IFS client transmits frame dimensions to the IBT, the IBT may dynamically configure the sizes of the I/O buffers and frame buffers for efficient transfer of data between the IFS client and a storage device such as a hard disk. For example, each frame buffer may be sized to contain a single frame, and each I/O buffer may be sized to contain a whole number of frame buffers. The size of the I/O buffer is dependent on the frame size and on the native OS and other system constraints. Herein, the size of the I/O buffer which maximizes the data transfer rate under specified conditions is referred to as the optimum I/O buffer size.

In one embodiment of an IFS, the sizes of the I/O buffers and frame buffers are configured to conform to DICOM standards, which require configuring digital image data for all frames in a series to be a contiguous array. In a multi-frame image, consecutive frames are concatenated with no padding bits between frames. To conform to this requirement, in some instances, it may be necessary to break one frame into fragments across two consecutive I/O buffers. This condition is determined by the image buffering thread upon receipt of the frame size. If no multiple of the frame size exists such that the resulting I/O buffer size conforms to the requirements of the native file system, the optimally sized I/O buffer will be temporarily expanded to fit additional image data which can then be copied to or from a different I/O buffer for writes and reads respectively.

Figure 7:
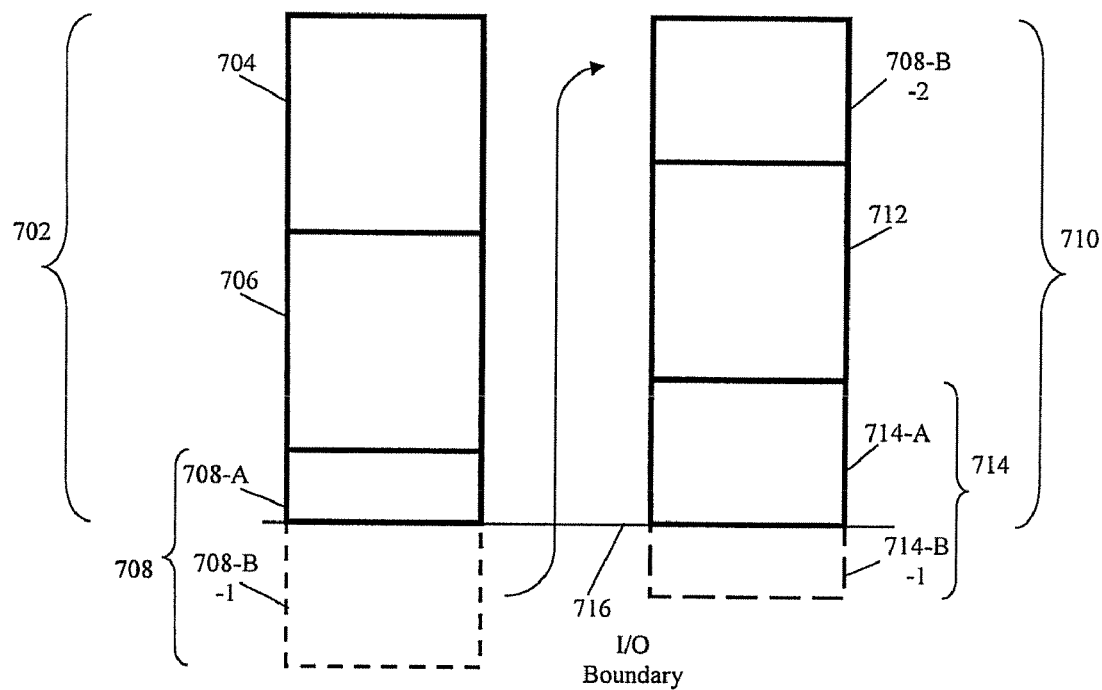
FIG. 7 shows fragmenting of frames into multiple I/O blocks.

FIG. 7 shows an example of fragmentation of frames in a write operation. Elements 702 and 710 represent two sequential I/O blocks of optimum size; 716 represents the I/O boundary which delimits the block size. Block 702 contains two complete frames, 704 and 706. There is not enough capacity, however, to hold the complete third frame 708. This frame is then fragmented into partial frames 708-A and 708-B-1. Extra memory is temporarily added to block 702 to buffer 708-B-1, which is then copied to the beginning of block 710. Block 710 now contains partial frame 708-B-2 (a copy of 708-B-1), complete frame 712, and a part of frame 714. This partial frame is denoted 714-A. The remaining partial frame 714-B-1 is then processed in the same manner as partial image 708-B-1.

In one embodiment of an IFS, IFS client 402 does not store client data in client data buffer 402-A. IFS client 402 writes client data directly to streaming digital image I/O memory 410. In one embodiment of an IFS, IFS client 602 does not read data into client data buffer 602-A. IFS client 602 reads data directly from streaming digital image I/O memory 610. One skilled in the art may develop other methods and architectures for transferring data between an image file system client and an image file system.

Figure 8:
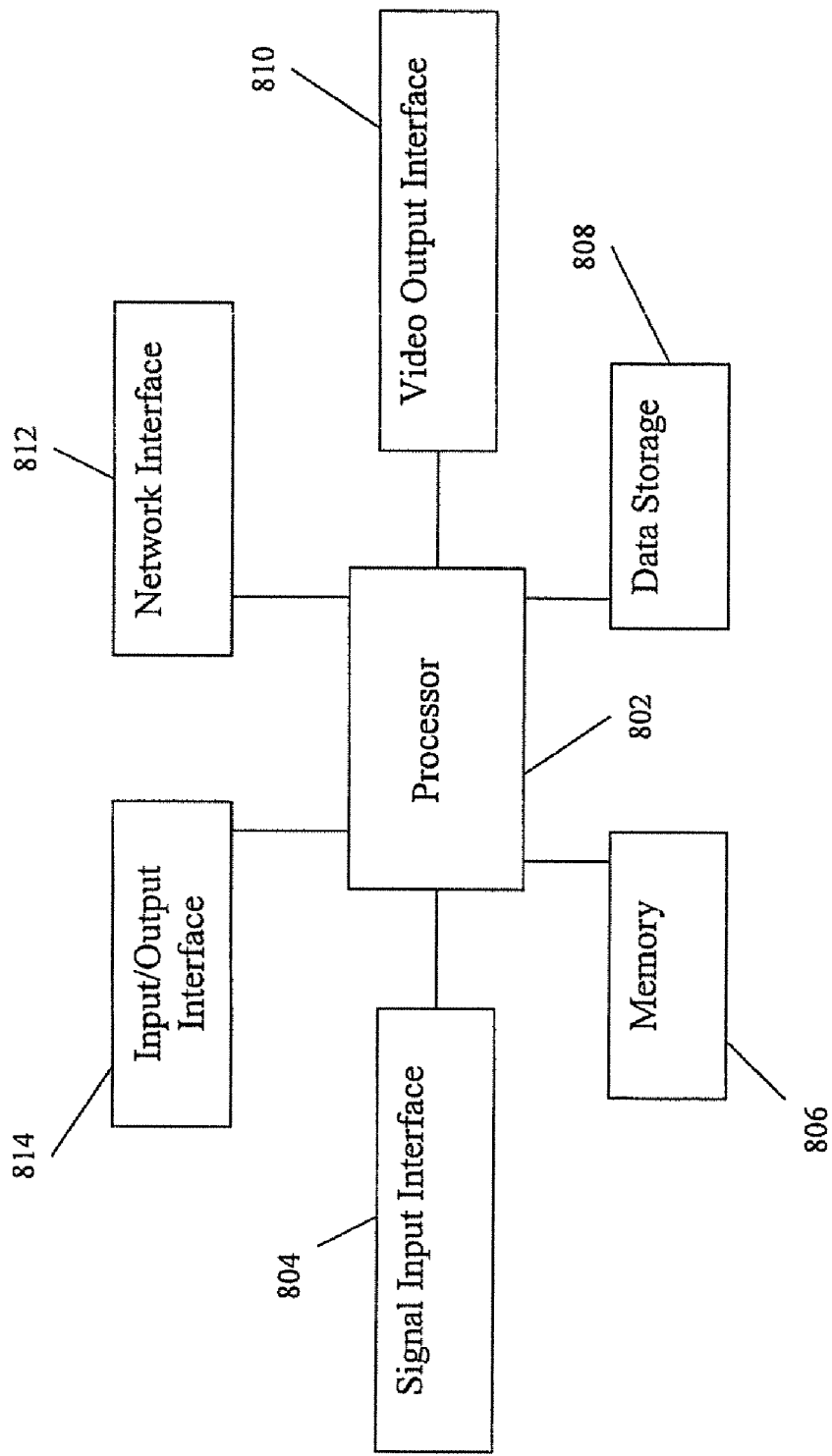
FIG. 8 shows a high-level block diagram of a computer which may be used to implement an embodiment of the present invention.

In one embodiment, the IFS described herein may be implemented as a computer. As shown in FIG. 8, a computer may be any type of well-known computer comprising processor 802, memory 806, data storage 808, user input/output interface 814, and network interface 812. It may further comprise signal input interface 804 and video output interface 810. Data storage 808 may comprise one or more hard drives or non-volatile memory. User input/output interface 814 may comprise a connection to a keyboard or mouse. Signal input interface 804 may transform incoming signals to signals capable of being processed by processor 802. Video output interface 810 may transform signals from processor 802 to signals which may drive a video controller. Network interface 812 may comprise a connection to an Internet Protocol (IP) network. As is well known, a computer operates under control of computer software which defines the overall operation of the computer and applications. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for writing digital image data in an image file system comprising:
   receiving input digital image data and an indicator of whether said input digital image data is streaming digital image data or non-streaming digital image data;
   if said input digital image data is non-streaming digital image data:
      writing said non-streaming digital image data to persistent storage media using buffered mode write operation by native operating system input/output support;
   if said input digital image data is streaming digital image data:
      buffering said streaming digital image data into a plurality of frame buffers within an individual input/output buffer of streaming digital image input/output memory; and
      writing said streaming digital image data from said frame buffers and input/output buffers to said persistent storage media using unbuffered mode write operation by said native operating system input/output support; and
   dynamically reconfiguring said plurality of frame buffers by automatically partitioning said frame buffers in response to received data indicating pixel dimensions of a single frame, for efficient transfer of data without system reboot to store a plurality of frames of an image series in a contiguous multi-frame array.

2. The method of claim 1, wherein said step of buffering further comprises:
automatically partitioning said input/output buffers in response to received data indicating pixel dimensions of a single frame;
fragmenting a frame into two portions for storage across a border between contiguous input/output buffers;
receiving a frame size of said streaming digital image data;
calculating a size of said frame buffer based at least in part on said received frame size;
calculating a size of said input/output buffer based at least in part on said received frame size; and
dynamically reconfiguring size of said plurality of frame buffers in response to said received frame size.

3. The method of claim 1, wherein said steps of writing said streaming and non-streaming digital image data further comprises:
dynamically configuring said plurality of frame buffers to store frames contiguously within an individual input/output buffer by dynamically partitioning said input/output buffer into frame buffers and using temporary memory in fragmenting a frame into two portions for storage across a border between contiguous input/output buffers and said image series is a DICOM compatible image series.

4. A method for reading stored digital image data in an image file system comprising:
receiving an indicator of whether said stored digital image data is streaming digital image data or non-streaming digital image data;
if said stored digital image data is non-streaming digital image data:
reading said non-streaming digital image data using buffered mode read operation by native operating system input/output support; if said stored digital image data is streaming digital image data:
buffering said streaming digital image data into a plurality of frame buffers within an individual input/output buffer of streaming digital image input/output memory; and
reading said streaming digital image data from said frame buffers and input/output buffers using unbuffered mode read operation by said native operating system input/output support;
automatically partitioning said input/output buffers in response to received data indicating pixel dimensions of a single frame and
dynamically reconfiguring size of said plurality of frame buffers for efficient transfer of data without system reboot by allocating said size to store a plurality of frames of an image series in a contiguous multi-frame array.

5. The method of claim 4, wherein said step of buffering further comprises:
receiving a frame size of said streaming digital image data;
calculating a size of said frame buffer based at least in part on said received frame size;
calculating a size of said input/output buffer based at least in part on said received frame size; and
dynamically reconfiguring size of said plurality of frame buffers in response to said received frame size.

6. The method of claim 4, wherein said steps of reading said streaming and non-streaming digital image data further comprises:
dynamically configuring said plurality of frame buffers to store frames contiguously within an individual input/output buffer by dynamically partitioning said input/output buffer into frame buffers.

7. Apparatus for writing digital image data in an image file system comprising:
means for receiving input digital image data and an indicator of whether said input digital image data is streaming digital image data or non-streaming digital image data;
means for writing non-streaming digital image data to persistent storage media using buffered mode write operation by native operating system input/output support;
means for buffering said streaming digital image data into a plurality of frame buffers within an individual input/output buffer of streaming digital image input/output memory and dynamically reconfiguring said plurality of frame buffers by automatically partitioning said frame buffers in response to received data indicating pixel dimensions of a single frame, for efficient transfer of data without system reboot to store a plurality of frames of an image series in a contiguous multi-frame array; and
means for writing said buffered streaming digital image data from said frame buffers and input/output buffers to said persistent storage media using unbuffered mode write operation by said native operating system input/output support.

8. The apparatus of claim 7, wherein said means for buffering further comprises:
means for automatically partitioning said input/output buffers in response to received data indicating pixel dimensions of a single frame;
means for receiving a frame size of said streaming digital image data;
means for calculating a size of said frame buffer based at least in part on said received frame size;
means for calculating a size of said input/output buffer based at least in part on said received frame size; and
means for dynamically reconfiguring size of said plurality of frame buffers in response to said received frame size.

9. The apparatus of claim 7, wherein said means for writing said streaming and non-streaming digital image data further comprises:
means for dynamically configuring said plurality of frame buffers to store frames contiguously within an individual input/output buffer by dynamically partitioning said input/output buffer into frame buffers.

10. Apparatus for reading stored digital image data in an image file system comprising:
means for receiving an indicator of whether said stored digital image data is streaming digital image data or non-streaming digital image data;
means for reading said non-streaming digital image data using buffered mode read operation by native operating system input/output support;
means for buffering said streaming digital image data into a plurality of frame buffers within an individual input/output buffer of streaming digital image input/output memory and dynamically reconfiguring said plurality of frame buffers by automatically partitioning said frame buffers in response to received data indicating pixel dimensions of a single frame, for efficient transfer of data without system reboot to store a plurality of frames of an image series in a contiguous multi-frame array; and means for reading said streaming digital image data from said frame buffers and input/output buffers using unbuffered mode read operation by said native operating system input/output support.

11. The apparatus of claim 10, wherein said means for buffering further comprises:
automatically partitioning said input/output buffers in response to received data indicating pixel dimensions of a single frame;
means for receiving a frame size of said streaming digital image data;
means for calculating a size of said frame buffer based at least in part on said received frame size;
means for calculating a size of said input/output buffer based at least in part on said received frame size; and
means for dynamically reconfiguring size of said plurality of frame buffers in response to said received frame size.

12. The apparatus of claim 10, wherein said means for writing said streaming and non-streaming digital image data further comprises:
means for dynamically configuring said plurality of frame buffers to store frames contiguously within an individual input/output buffer by dynamically partitioning said input/output buffer into frame buffers.

13. A non-transitory tangible computer readable medium storing computer program instructions for writing digital image data in an image file system, the computer program instructions defining the steps of:
receiving input digital image data and an indicator of whether said input digital image data is streaming digital image data or non-streaming digital image data;
if said input digital image data is non-streaming digital image data:
writing said non-streaming digital image data to persistent storage media using buffered mode write operation by native operating system input/output support;
if said input digital image data is streaming digital image data:
buffering said streaming digital image data into a plurality of frame buffers within an individual input/output buffer of streaming digital image input/output memory; and
writing said streaming digital image data from said frame buffers and input/output buffers to said persistent storage media using unbuffered mode write operation by said native operating system input/output support automatically partitioning said input/output buffers in response to received data indicating pixel dimensions of a single frame; and
dynamically reconfiguring said plurality of frame buffers by automatically partitioning said frame buffers in response to received data indicating pixel dimensions of a single frame, for efficient transfer of data without system reboot to store a plurality of frames of an image series in a contiguous multi-frame array.

14. The tangible computer readable medium of claim 13 wherein said computer program instructions defining the step of buffering further comprise computer program instructions defining the steps of:
receiving a frame size of said streaming digital image data;
calculating a size of said frame buffer based at least in part on said received frame size;
calculating a size of said input/output buffer based at least in part on said received frame size; and
dynamically reconfiguring size of said plurality of frame buffers in response to said received frame size.

15. The tangible computer readable medium of claim 13 wherein said computer program instructions defining the step of writing digital image data in an image file system further comprise computer program instructions defining the step of:
dynamically configuring said plurality of frame buffers to store frames contiguously within an individual input/output buffer by dynamically partitioning said input/output buffer into frame buffers.

16. A non-transitory tangible computer readable medium storing computer program instructions for reading stored digital image data in an image file system, the computer program instructions defining the steps of:
receiving an indicator of whether said stored digital image data is streaming digital image data or non-streaming digital image data;
if said stored digital image data is non-streaming digital image data:
reading said non-streaming digital image data using buffered mode read operation by native operating system input/output support;
if said stored digital image data is streaming digital image data:
buffering said streaming digital image data into a plurality of frame buffers within an individual input/output buffer of streaming digital image input/output memory and dynamically reconfiguring said plurality of frame buffers by automatically partitioning said frame buffers in response to received data indicating pixel dimensions of a single frame, for efficient transfer of data without system reboot to store a plurality of frames of an image series in a contiguous multi-frame array; and
reading said streaming digital image data from said frame buffers and input/output buffers using unbuffered mode read operation by said native operating system input/output support.

17. The tangible computer readable medium of claim 16 wherein said computer program instructions defining the step of buffering further comprise computer program instructions defining the steps of:
automatically partitioning said input/output buffers in response to received data indicating pixel dimensions of a single frame;
receiving a frame size of said streaming digital image data;
calculating a size of said frame buffer based at least in part on said received frame size;
calculating a size of said input/output buffer based at least in part on said received frame size; and
dynamically reconfiguring size of said plurality of frame buffers in response to said received frame size.

18. The tangible computer readable medium of claim 16 wherein said computer program instructions defining the step of reading stored digital image data in an image file system further comprise computer program instructions defining the step of:
dynamically configuring said plurality of frame buffers to store frames contiguously within an individual input/output buffer by dynamically partitioning said input/output buffer into frame buffers.

* * * * *